(12) United States Patent
Hoch et al.

(10) Patent No.: US 12,639,630 B2
(45) Date of Patent: May 26, 2026

(54) DETECTION OF DATA DRIFT FOR A ML MODEL

(71) Applicant: NEC Corporation Of America, Herzlia (IL)

(72) Inventors: Yaacov Hoch, Ramat-Gan (IL); Maya Cohen Maimon, Holon (IL)

(73) Assignee: NEC Corporation Of America, Herzlia (IL)

( * ) Notice: Subject to any disclaimer, the term of this patent is extended or adjusted under 35 U.S.C. 154(b) by 542 days.

(21) Appl. No.: 18/219,768

(22) Filed: Jul. 10, 2023

(65) Prior Publication Data

US 2025/0021862 A1      Jan. 16, 2025

(51) Int. Cl.
*G06N 20/00* (2019.01)
(52) U.S. Cl.
CPC .................................... *G06N 20/00* (2019.01)
(58) Field of Classification Search
CPC ..................................................... G06N 20/00
See application file for complete search history.

(56) References Cited

U.S. PATENT DOCUMENTS

2026/0037853 A1* 2/2026 Bruce .................... G06N 20/00

* cited by examiner

*Primary Examiner* — Y Lee

(57) ABSTRACT

There is provided a computer implemented method of detecting data drift for changing a machine learning (ML) model, comprising: monitoring a target input dataset for being fed into the ML model, extracting a plurality of target candidate features from the target input dataset, applying a feature selection process for selecting a target subset of the plurality of target candidate features, accessing a historical input dataset previously determined as being suitable for being fed into the ML model, extracting a plurality of historical candidate features from the historical input dataset, applying the feature selection process for selecting a historical subset of the plurality of historical candidate features, computing a comparison between the target subset and the historical subset, and in response to the comparison meeting a requirement indicating a significant difference between the target subset and the historical subset, generating an indication for changing the ML model.

18 Claims, 4 Drawing Sheets

Obtain ML model 302

Extract training candidate features 304

Apply feature selection 306

Access target dataset 308

Extract target candidate features 310

Apply feature selection 312

Compute comparison 314

ML model is validated 316

ML model is not validated 318

| Train data (all feat) | Test 2020 | Test 2021 |
|---|---|---|
| 2020 | 99.8% | 94% |
| 2021 | 68% | 99.9% |

← 402

1.2 Select best features from data 2020, train RF and test on two subsets data2020 and data2021

| Train data (best 20 feat. from 2020) | Test 2020 | Test 2021 |
|---|---|---|
| 2020 | 99.5% | 62% |
| 2021 | 68% | 99.9% |

← 404

1.3 1.2 Select best features from data 2021, train RF and test on two subsets data2020 and data2021

| Train data (best 20 feat. from 2021) | Test 2020 | Test 2021 |
|---|---|---|
| 2020 | 99.8% | 91% |
| 2021 | 63% | 99.9% |

DETECTION OF DATA DRIFT FOR A ML MODEL

FIELD AND BACKGROUND OF THE INVENTION

The present invention, in some embodiments thereof, relates to machine learning models and, more specifically, but not exclusively, to systems and methods for determining when to update and/or retrain machine learning models.

Data drift refers to the phenomenon where the statistical properties of the data used to train a machine learning model change over time, leading to a degradation in the model's performance. It occurs when the assumptions made during the model's training no longer hold in the real-world deployment environment.

Machine learning models that experience data drift need to be updated and/or retrained.

SUMMARY OF THE INVENTION

According to a first aspect, a computer implemented method of detecting data drift for changing a machine learning (ML) model, comprises: monitoring a target input dataset for being fed into the ML model, extracting a plurality of target candidate features from the target input dataset, applying a feature selection process for selecting a target subset of the plurality of target candidate features, accessing a historical input dataset previously determined as being suitable for being fed into the ML model, extracting a plurality of historical candidate features from the historical input dataset, applying the feature selection process for selecting a historical subset of the plurality of historical candidate features, computing a comparison between the target subset and the historical subset, and in response to the comparison meeting a requirement indicating a significant difference between the target subset and the historical subset, generating an indication for changing the ML model.

According to a second aspect, a computer implemented method of validating a machine learning (ML) model, comprises: obtaining a ML model trained on a historical training dataset, extracting a plurality of training candidate features from the historical training dataset, applying a feature selection process for selecting a training subset of the plurality of training candidate features, accessing a target dataset representing generated data destined for being fed into the ML model, extracting a plurality of target candidate features from the target dataset, applying a feature selection process for selecting a target subset of the plurality of target candidate features, computing a comparison between the training subset and the target subset, and in response to the comparison meeting a requirement indicating a non-significant difference between the training subset and the target subset, generating an indication that the ML model is validated for being fed the target dataset.

According to a third aspect, a system for detecting data drift for changing a machine learning (ML) model, comprises: at least one processor executing a code for: monitoring a target input dataset for being fed into the ML model, extracting a plurality of target candidate features from the target input dataset, applying a feature selection process for selecting a target subset of the plurality of target candidate features, accessing a historical input dataset previously determined as being suitable for being fed into the ML model, extracting a plurality of historical candidate features from the historical input dataset, applying the feature selection process for selecting a historical subset of the plurality of historical candidate features, computing a comparison between the target subset and the historical subset, and in response to the comparison meeting a requirement indicating a significant difference between the target subset and the historical subset, generating an indication for changing the ML model.

In a further implementation form of the first, second, and third aspects, the feature selection process comprises defining a target function according to the plurality of target candidate features and a correlation with an expected outcome of the ML model being fed the input dataset, and finding a minimum of the target function, the minimum representing the target subset.

In a further implementation form of the first, second, and third aspects, further comprising applying a quantum annealer based process for finding the minimum of the function.

In a further implementation form of the first, second, and third aspects, the plurality of candidate features are different from features extracted from the input dataset for being fed into the ML model.

In a further implementation form of the first, second, and third aspects, none of the plurality of candidate features extracted from the input dataset are fed into the ML model.

In a further implementation form of the first, second, and third aspects, the plurality of candidate features corresponding to the extracted features fed into the ML model.

In a further implementation form of the first, second, and third aspects, computing the comparison comprising computing a correlation between the target subset and the historical subset.

In a further implementation form of the first, second, and third aspects, computing the comparison comprises identifying overlapping features between the target subset and the historical subset.

In a further implementation form of the first, second, and third aspects, the requirement is for the number of overlapping features being less than a threshold selected according to at least one of: function of a number of features of the target subset, function of a number of features of the historical subset, and combination thereof.

In a further implementation form of the first, second, and third aspects, further comprising in response to the comparison meeting the requirement, automatically re-training the ML model with a training dataset that is statically similar to the target input dataset.

In a further implementation form of the first, second, and third aspects, further comprising in response to the comparison meeting the requirement, automatically re-training the ML model with the target sub-set of features.

In a further implementation form of the first, second, and third aspects, further comprising in response to the comparison meeting the requirement, automatically re-training the ML model with a combination of the target sub-set of features and the historical sub-set of features.

In a further implementation form of the first, second, and third aspects, the target candidate features comprise current data designated for being fed into the ML model of a current update version, and the historical input dataset was previously determined as being suitable for being fed into the ML model of the current update version after being updated from a historical update version.

In a further implementation form of the first, second, and third aspects, the features of the method are iterated in a plurality of iterations, wherein the target input dataset of a current iteration is designated as the historical input dataset of a subsequent iteration, and the target input dataset of the subsequent iteration is obtained as data obtained in real time or near real-time.

In a further implementation form of the first, second, and third aspects, the features of the method are iterated in a plurality of iterations, wherein in each iteration the target input dataset represents data obtained after at least a time interval of a selected length has elapsed after a timestamp indicating the historical input dataset has been originally obtained.

In a further implementation form of the first, second, and third aspects, the features of the method are iterated in a plurality of iterations, wherein in each iteration the target input dataset represents data obtained after at least a selected quantity of data has been fed into the ML model after the historical input dataset has been fed into the ML model.

In a further implementation form of the first, second, and third aspects, the features of the method are iterated for each new target input dataset being fed into the ML model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 includes tables summarizing performance of the Random Forest model for different combinations of selected features and datasets of the experiment, in accordance with some embodiments of the present invention.

DESCRIPTION OF SPECIFIC EMBODIMENTS OF THE INVENTION

Figure 1:
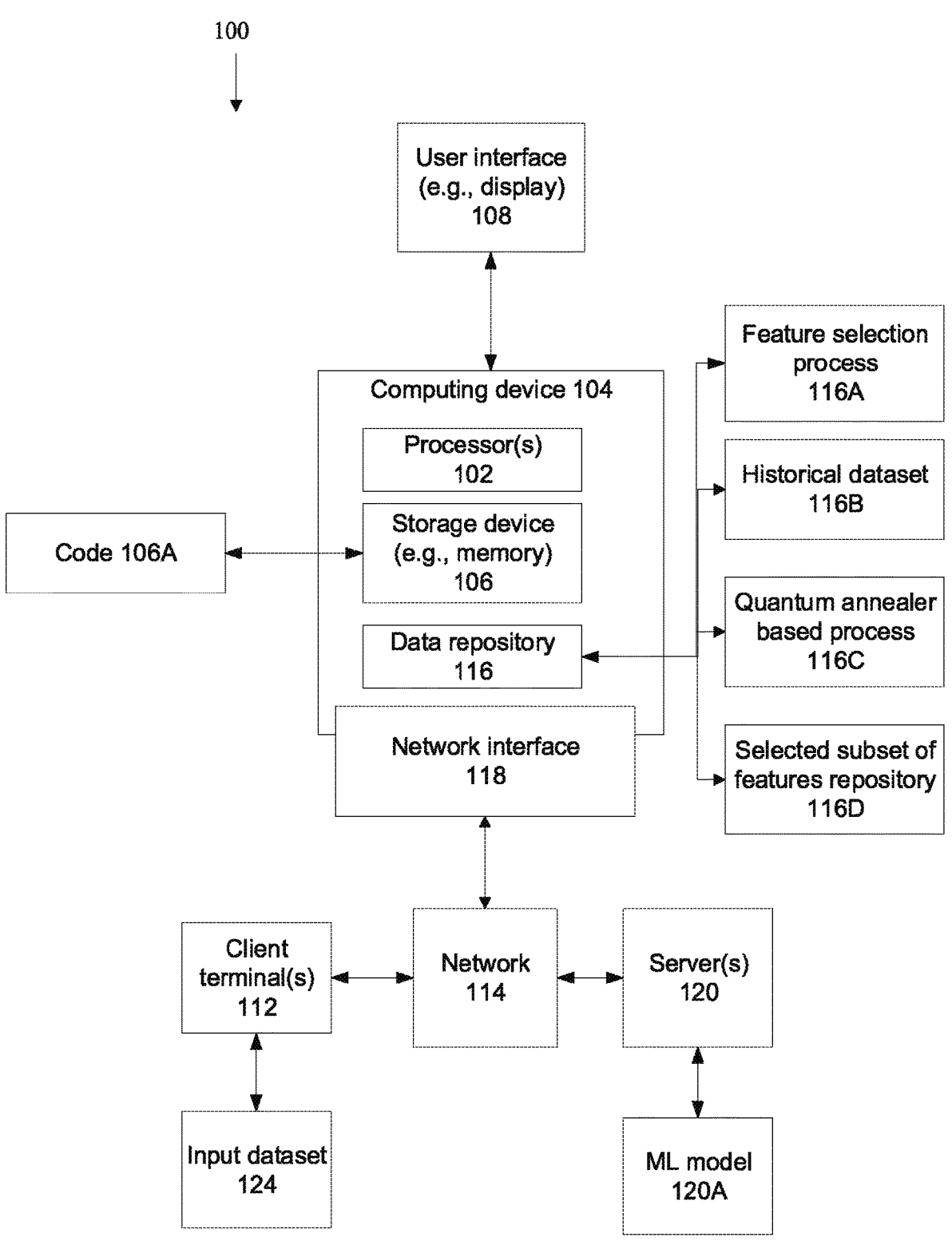
FIG. 1 is a block diagram of components of a system for detecting data drift and/or evaluating a ML model for inference on a dataset, in accordance with some embodiments of the present invention.

The present invention, in some embodiments thereof, relates to machine learning models and, more specifically, but not exclusively, to systems and methods for determining when to update and/or retrain machine learning (ML) models.

An aspect of some embodiments of the present invention relates to systems, methods, computing devices, and/or code instructions (e.g., stored on a data storage device and executable by one or more processors) for detecting data drift, in response to which a ML model is to be updated, retrained, and/or changed. For example, the data drift for new data in comparison to historical data reduces performance of the ML model fed the new data, in comparison to performance of the ML model fed the historical data. A processor monitors target input dataset designated for being fed into the ML model, for example, at predefined time intervals, and/or after a predefined amount of data has elapsed, and/or other events. Multiple target candidate features are extracted from the target input dataset. A feature selection process is applied for selecting a target subset of the target candidate features. A historical input dataset previously determined as being suitable for being fed into the ML model is accessed. For example, the ML model has been previously evaluated to provide satisfactory performance in response to being fed the historical input dataset. Historical candidate features are extracted from the historical input dataset. The feature selection process is applied for selecting a historical subset of the plurality of historical candidate features. A comparison between the target subset and the historical subset is performed, for example, to determine overlapping features, and/or to determine changes in the features between the subsets, a correlation between the subsets, and the like. The comparison between the target subset and the historical subset may serve as a proxy for estimating whether data drift has occurred such that the ML model is predicted to classify the target subset at a lower accuracy than classification of the historical subset. In response to the comparison meeting a requirement indicating a significant difference between the target subset and the historical subset, an indication for changing the ML model is generated. The ML model may be changed, for example, trained on new data having distribution similar to the target input data, and/or trained on a combination of new data and historical data having distribution similar to a combination of the target input data and historical input data.

The comparison between the target subset and the historical subset may serve as a proxy for estimating whether data drift has occurred such that the ML model is predicted to classify the target subset at a lower accuracy than classification of the historical subset. The feature extraction and comparison may be performed more quickly and/or in a more computationally efficient manner than standard approaches for evaluating data drift.

Optionally, a quantum annealer based process is used for the feature selection process. The quantum anneal based process enables fast and/or computationally efficient execution of the feature selection process, enabling for feature selection to be performed iteratively on the monitored data. The iterative feature selection provides quick and/or iterative identification of data drift, enabling rapid response by updating and/or changing and/or retraining the ML model. In contrast existing approaches of feature selection take a considerable amount of time and/or require significant utilization of processing resources. Therefore, feature selection using standard approaches cannot be done iteratively, and may cause a significant delay in detecting data drift.

An aspect of some embodiments of the present invention relates to systems, methods, computing devices, and/or code instructions (e.g., stored on a data storage device and executable by one or more processors) for validating a ML model by predicting whether the ML model will perform according to a requirement on a current dataset. For example, whether a new ML model, changed ML model, updated ML model, and/or retrained ML model, is predicted to perform well when classifying the current dataset. The ML model which is being validated has been trained on a historical training dataset. Training candidate features are extracted from the historical training dataset. A feature selection process is applied for selecting a training subset of the training candidate features. A target dataset representing generated data destined for being fed into the ML model is obtained. The target dataset may represent current data, for which the ML model is being validated, to determine whether the ML model is suitable for processing the target dataset (e.g., whether the ML model is predicted to obtain classification performance according to a requirement). Target candidate features are extracted from the target dataset. A feature selection process is applied for selecting a target subset of the target candidate features. A comparison between the training subset and the target subset is performed, for determining whether there is a significant change. In response to the comparison meeting a requirement indicating a non-significant difference between the training subset and the target subset, an indication that the ML model is validated for being fed the current dataset, may be generated.

At least some embodiments of the systems, methods, computing devices, and/or code instructions (e.g., stored on a memory and executable by one or more processors) described herein address the technical problem of determining when to update and/or retrain a machine learning model. At least some embodiments of the systems, methods, computing devices, and/or code instructions described herein improve the technical field of machine learning models, by providing an approach for determining when to update and/or retrain the ML model. At least some embodiments of the systems, methods, computing devices, and/or code instructions described herein improve upon prior approaches of determining when to update and/or retrain the ML model, by enabling rapid and/or accurate evaluation of changes of the data being fed into ML model, enabling continuous and/or timely evaluate, for quickly determining when the distribution of the data indicates that the ML model is to be updated and/or retrained.

At least some embodiments of the systems, methods, computing devices, and/or code instructions described herein address the technical problem of improving computational efficiency of a computing device for determining when to update and/or retrain a machine learning model. At least some embodiments of the systems, methods, computing devices, and/or code instructions described herein improve the technical field of machine learning models, by improving computationally efficiency of the computing device for determining when to update and/or retrain the ML model. At least some embodiments of the systems, methods, computing devices, and/or code instructions described herein improve upon prior approaches of determining when to update and/or retrain the ML model, by providing approaches that are more computationally efficient.

Improvement in computational efficiency of the computing device (e.g., as provided by at least some embodiments described herein) may refer to, for example: reduced processing time using available processing resources, reduced utilization of processing resources, and/or reduced data storage requirements.

At least some embodiments of the systems, methods, computing devices, and/or code instructions described herein address the technical problem of, given a certain ML model, determining whether the certain ML model is valid for being fed current data. At least some embodiments of the systems, methods, computing devices, and/or code instructions described herein improve the technical field of machine learning models, by providing an approach for determining when a certain ML model is valid for being fed current data. At least some embodiments of the systems, methods, computing devices, and/or code instructions described herein improve upon prior approaches, by providing an approach for determining whether a certain ML model is valid for being fed current data.

In many scenarios, data that is fed into a trained ML model changes over time (e.g., distribution of the data changes). For example, online services may use ML models (e.g., in production). The ML models need to be updated from time to time, for different reasons. For example: to reflect changes of data, based on a business requirement, for improving performance, regulation, compliance, technical improvement, and the like. Existing ML models may not be valid for being fed current data. The technical challenge is deciding when the updating/re-training is to occur, for several reasons, for example:

Evaluating data drift is computationally inefficient.

Repeatedly evaluating for data drift is computationally inefficient.

Retraining and/or updating the ML model is computationally inefficient.

Changing ML models may be risky, for example:

The new ML model may experience data drift, such as when the new training data is too different from the current data.

Model overfitting.

ML model is not generalized enough.

New trained ML model has errors.

At least some embodiments of the systems, methods, computing devices, and/or code instructions described herein address the aforementioned technical problem, and/or improve upon the aforementioned technical field, and/or improve upon prior approaches, by extracting features from a current dataset (which is being fed into the ML model) and a historical dataset. The features are analyzed to determine whether the features extracted from the current dataset are sufficiently different from features extracted from historical dataset. An indication for updating the ML model is generated when the extracted features are sufficiently different. Alternatively or additionally, an indication that the ML model is suitable for being fed the current dataset is generated when the extracted features are sufficiently similar (i.e., not sufficiently different).

The features may be selected using an optimization engine which is computationally efficient, for example, based on a quantum annealer process. The quantum annealer is a machine designed to efficiently solve optimization problems. An example of the optimization engine based on the quantum annealer process is a Dwave annealer. The quantum annealer operates by exploiting quantum features of particles to find the global minimum of a cost function. The quantum annealer may be used to select the features which are extracted from a dataset, by solving a feature selection problem quickly and/or in a computationally efficient manner. For example, finding the best set of features that represent a target function defined based on the ML model. The quantum annealer may be used, for example, to quickly and/or computationally efficiently solve the FS problem, for extracting features from a current dataset and from a historical dataset, for determining whether the extracted features are sufficiently different indicating that the ML model requires updating and/or retraining, and/or whether the extracted features are not sufficiently different indicating that the ML model is validated for use with the current dataset.

Quickly selecting features enables repeatedly performing feature selection, such as over short time intervals, enabling repeatedly evaluating whether the ML model requires changing. In contrast, standard feature selection approaches take a significantly long time and cannot be used for repeatedly evaluating whether the ML model requires changing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
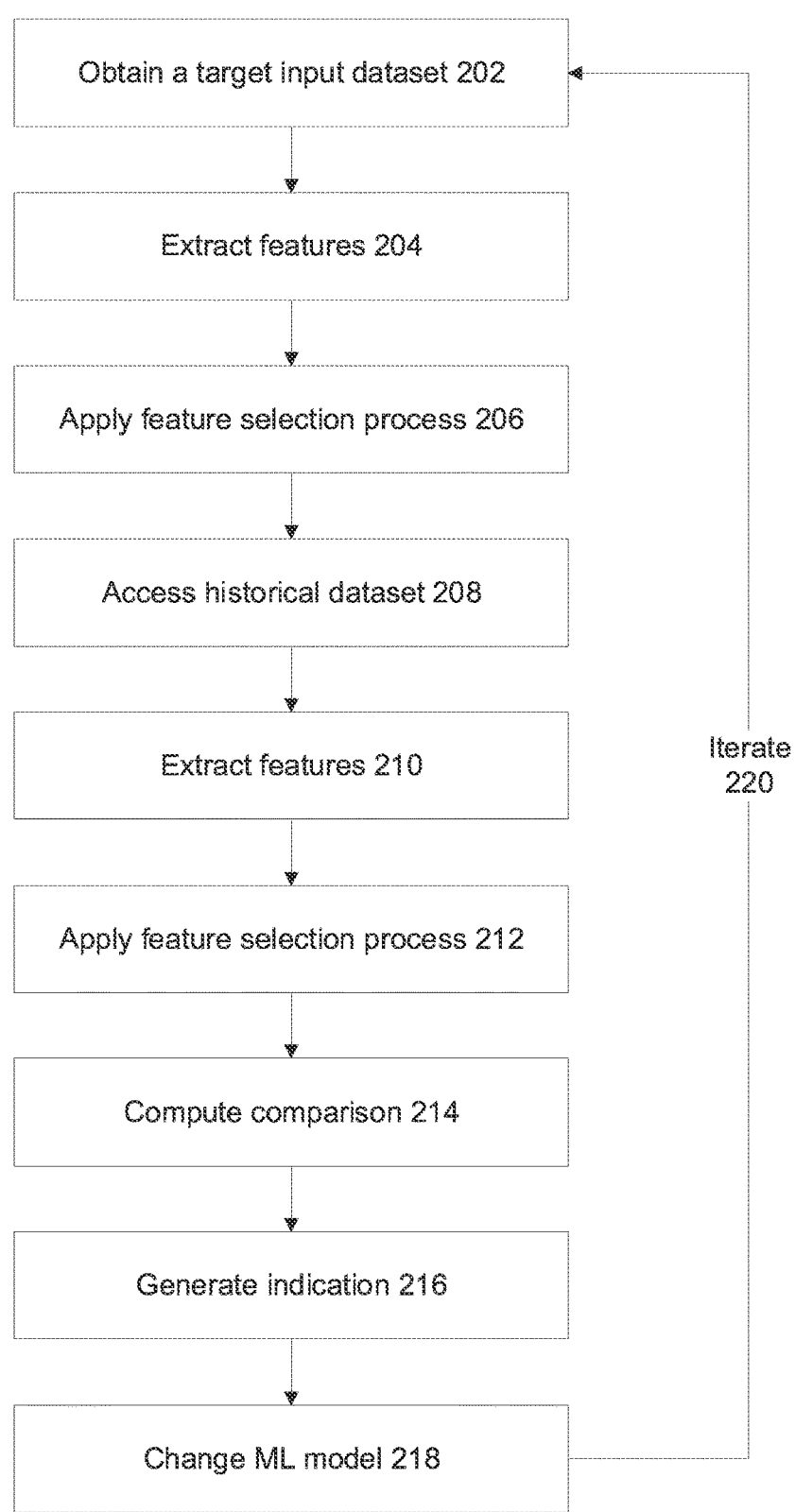
FIG. 2 is a flowchart of an exemplary method for detecting data drift of data being fed into a ML model, in accordance with some embodiments of the present invention.
Figure 3:
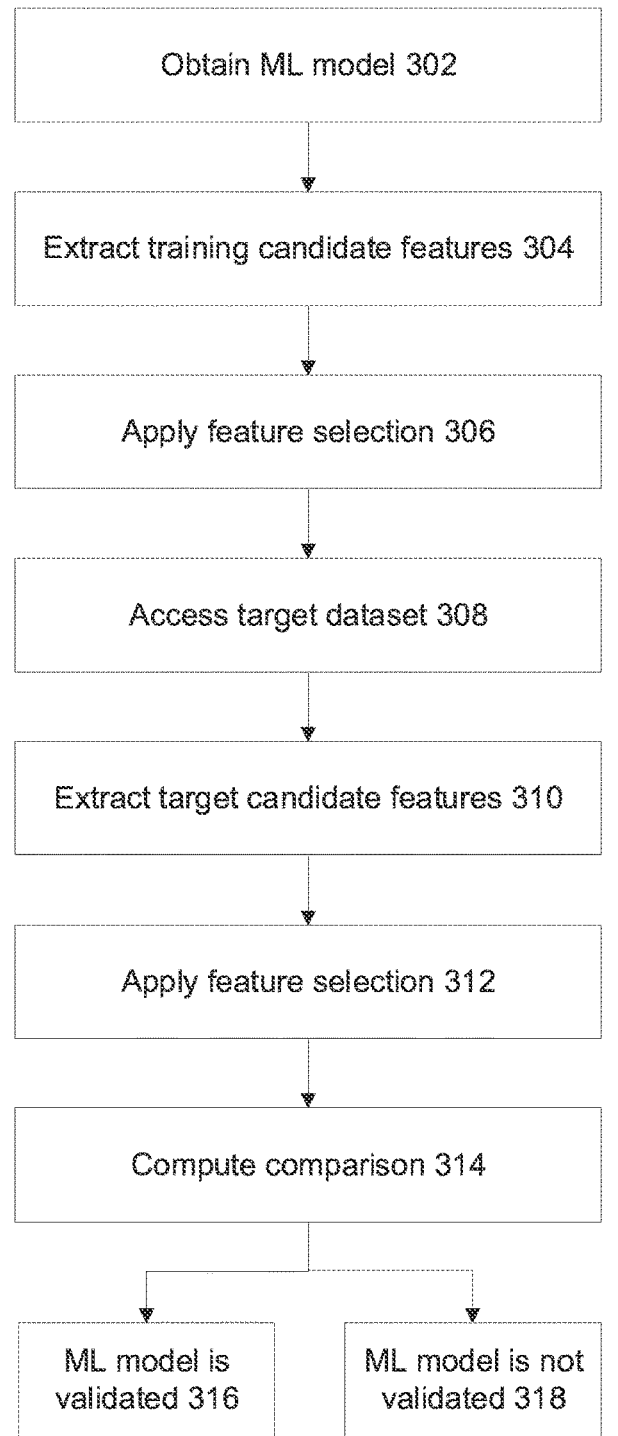
FIG. 3 is a flowchart of an exemplary method for validating a ML model for being fed a dataset, in accordance with some embodiments of the present invention.

Reference is now made to FIG. 1, which is a block diagram of components of a system 100 for detecting data drift and/or evaluating a ML model for inference on a dataset, in accordance with some embodiments of the present invention. Reference is also made to FIG. 2, which is a flowchart of an exemplary method for detecting data drift of data being fed into a ML model, in accordance with some embodiments of the present invention. Reference is also made to FIG. 3, which is a flowchart of an exemplary method for validating a ML model for being fed a dataset, in accordance with some embodiments of the present invention.

System 100 may implement the acts of the method described with reference to FIGS. 2-3 and/or other methods described herein, by processor(s) 102 of a computing device 104 executing code instructions 106A stored in a storage device 106 (also referred to as a memory and/or program store).

Computing device 104 may be implemented as, for example, a client terminal, a server, a single computer, a group of computers, a computing cloud, a virtual server, a virtual machine, a mobile device, a desktop computer, a thin client, a Smartphone, a Tablet computer, a laptop computer, a wearable computer, glasses computer, and a watch computer.

Multiple architectures of system 100 based on computing device 104 may be implemented. In an exemplary implementation of a centralized architecture, computing device 104 storing code 106A, may be implemented as one or more servers (e.g., network server, web server, a computing cloud, a virtual server) that provides services (e.g., one or more of the acts described with reference to FIGS. 2-3 and/or other methods described herein) to one or more client terminals 112 and/or server(s) 120 over a network 114, for example, providing software as a service (SaaS) to the client terminal(s) 112 and/or server(s) 120, providing software services accessible using a software interface (e.g., application programming interface (API), software development kit (SDK)), providing an application for local download to the client terminal(s) 112 and/or server(s) 120, and/or providing functions using a remote access session to the client terminals 112 and/or server(s) 120, such as through a web browser.

In an example of a centralized architecture, multiple different ML models 120A may be running on server(s) 120, for example, production data science models running on online services. Different client terminal 112 may each provide a different respective input dataset 124 for feeding into corresponding ML models 120A. For example, each client terminal 112 remotely accesses a respective server 120 over network 114, and provides input dataset 124 to server 120 for feeding into a corresponding ML model 120A. Computing device 104 evaluates each one of the different ML models 120A, by using a feature selection process 116A for selecting features from input dataset 124, optionally using a quantum annealer based process 116C, as described herein.

In another example of a localized architecture, computing device 104 may include locally stored software (e.g., code 106A) that performs one or more of the acts described with reference to FIGS. 2-3 and/or other methods described herein. ML model 120A may be running on computing device 104. Input dataset 124 is locally fed into ML model 120A by computing device 104. Input dataset 124 may be obtained from different sources, for example, from client terminal(s) 112, generated by computing device 104, and/or obtained from another external source. Computing device 104 locally evaluates ML model 120A, by using a feature selection process 116A for selecting features from input dataset 124, optionally using a quantum annealer based process 116C, as described herein.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include multiple processors (homogenous or heterogeneous) arranged for parallel processing, as clusters and/or as one or more multi core processing devices. Processor(s) 102 may be arranged as a distributed processing architecture, for example, in a computing cloud, and/or using multiple computing devices. Processor(s) 102 may include a single processor, where optionally, the single processor may be virtualized into multiple virtual processors for parallel processing, as described herein.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A that implements one or more features and/or acts of the method described with reference to FIGS. 2-3 and/or other methods described herein when executed by processor(s) 102.

Computing device 104 may include a data repository 116 for storing data, for example, storing one or more of a feature selection process 116A that selects a best subset of features, a historical dataset 116B from which features are extracted and selected for comparison with features extracted and selected from input dataset 124, a quantum annealer based process 116C for quickly performing feature selection, a selected subset of features repository 116D that stores the selected features, and the like, as described herein. Data repository 116 may be implemented as, for example, a memory, a local hard-drive, virtual storage, a removable storage unit, an optical disk, a storage device, and/or as a remote server and/or computing cloud (e.g., accessed using a network connection).

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 114 may be implemented as, for example, the internet, a local area network, a virtual private network, a wireless network, a cellular network, a local bus, a point to point link (e.g., wired), and/or combinations of the aforementioned.

Computing device 104 and/or client terminal(s) 112 include and/or are in communication with one or more physical user interfaces 108 that include a mechanism for a user to enter data (e.g., provide input data 124 for input into ML model 120A) and/or view data (e.g., indication of recommendation to change ML model 120A), optionally within a GUI. Exemplary user interfaces 108 include, for example, one or more of, a touchscreen, a display, a keyboard, a mouse, and voice activated software using speakers and microphone.

Referring now back to FIG. 2, at 202, a target input dataset designated for being fed into the ML model is accessed. The target input dataset may include current data which is for being fed into the ML model of a current updated version, i.e., the ML model has been previously created and/or updated.

The target input datasets that are being fed into the ML may be monitored. The target input dataset that is obtained and analyzed may be selected, for example, randomly, at predefined time intervals, at predefined data intervals, for each dataset, and the like.

The target input dataset may be, for example, numerical values, metadata, text, signals outputted by sensors, images, vectors, arrays, and the like.

A machine learning model refers to code stored on a data storage device, that when executed, causes a processor to generate an outcome in response to an input of data. The outcome may be, for example, a prediction, a classification category, a number, a label, and the like. The ML model is trained on a training dataset. The ML model may be trained on labeled data, where the input data is accompanied by the correct output or target value (also referred to as supervised learning). Alternatively or additionally, the ML model may be trained to discover patterns or structures in the data without explicit labels (also referred to as unsupervised learning). Exemplary architectures of ML models include one or combination of: a detector architecture, a classifier architecture, a pipeline combination of one or more architectures described herein, neural networks of various architectures (e.g., convolutional, fully connected, deep, encoder-decoder, recurrent, transformer, graph, generative), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning (e.g., q-learning, deep q-networks (DQN)).

At 204, target candidate features are extracted from the target input dataset.

The target candidate features may be extracted using standard feature extraction processes.

Optionally, the target candidate features correspond to the features that are extracted and fed into the ML model for inference. For example, the target candidate features may be the same full set as the features extracted and fed into the ML model. For example, when the ML model is implemented based on a random forest architecture, the target candidate features are the same features that are extracted and fed into the random forest ML model. In another example, target candidate features may overlap with the features extracted and fed into the ML model, and some target candidate features may be completely different from the features extracted and fed into the ML model. In yet another example, the target candidate features are different from the features extracted and fed into the ML model, optionally completely unrelated. For example, the ML model may be a neural network that is fed an image. The neural network implicitly extracts the features from the image during processing. The target candidate features may be extracted from the image using other approaches, for example, scale-invariant feature transform (SIFT) features.

The feature extraction process may include a feature generation process, in which a larger set of features is created from the extracted features, for example, by different combinations of operations applied to two or more extracted features. The expanded set of features may provide more features for selection.

At 206, a feature selection process may be implemented for selecting a target subset of the target candidate features. The selected features may be diverse, for example, significantly different from one another. The selected features may be, for example, about 1%, or 5%, or 10% of the full set of features, or other values.

Optionally, the feature selection process is implemented by defining a target function according to the target candidate features and a correlation with an expected outcome of the ML model being fed the input dataset. A minimum of the target function, representing the target subset of selected features is found. It is noted that alternatively the target function may be set up such that the maximum denotes the target subset of selected features.

Optionally, a quantum annealer based process is used for finding the minimum (or maximum) of the target function. The quantum annealer based process makes it feasible and/or practical to iteratively run the feature selection process (e.g., during iterations as described with reference to 220), by enabling the feature selection process to be run during a feasible time frame (e.g., order of seconds or minutes) on standard computational resources.

The feature selection process may be automatically converted to, and/or defined in, a mathematical notion referred to as QUBO (quadratic unconstrained binary optimization). The quantum annealer finds the minimum and/or maximum, which indicates the selected features.

At 208, a historical input dataset previously determined as being suitable for being fed into the ML model is accessed. The historical input dataset may be, for example, a dataset that was previously fed into the ML model after the ML model was trained and/or validated. The historical input dataset may represent a previously valid set of data, which was valid at the time it was created and/or fed into the ML model. The historical input dataset may have been previously determined as being suitable for being fed into the ML model of the current updated version after being updated from a historical update version. For example, the historical input dataset was used a short time after updating the ML model, where the distribution of the historical input dataset was statistically similar to the distribution of the training dataset used to train the ML model. The historical input dataset may be obtained from the training dataset used to train the current version of the ML model.

Determination of data drift of the target input dataset is done relative to the historical input dataset.

At 210, historical candidate features are extracted from the historical input dataset. The historical candidate features may correspond to the extracted target candidate features, for example, using the same features that are extracted (e.g., applying the same function to the input data, using the same feature such as address of device from which data packets originated) extraction approaches, and/or using similar extraction approaches (e.g., SIFT, and the like).

At 212, the feature selection process, as described with reference to 206, is used for selecting a historical subset of the historical candidate features.

At 214, a comparison is computed (e.g., performed) between the target subset and the historical subset.

The comparison may be used as a proxy to determining data drift. The comparison may be used, as a proxy, to predict performance of the ML model on the target dataset in comparison to the historical dataset.

The comparison may be performed to determine whether the target subset is sufficiently different from the historical subset, indicating that the statistical distribution of the target subset is significantly different from the statistical distribution of the historical subset. In other words, that data drift has likely occurred and the ML model is predicted to be unable to accurately classify the target subset.

Optionally, the comparison is performed by identifying overlapping features between the target subset and the historical subset. The percentage of overlapping features (or other metric) may indicate whether data drift has occurred. For example, when the number of overlapping features is low (e.g., compared to the overall number of the selected features in the subset(s)), it indicates that data drift has occurred. When the number of overlapping features is high, it indicates that the likelihood is that no significant data drift has occurred.

Alternatively or additionally, the comparison is performed by computing a correlation between the target subset and the historical subset. A correlation value below a correlation threshold may indicate that the two subsets are sufficiently different, indicating data drift has likely occurred.

Alternatively or additionally, the comparison is performed by computing a drift metric between the target subset and the historical subset. A drift metric above a drift threshold may indicate that the target subset has drifted from the historical subset, indicating data drift has likely occurred.

At 216, the comparison is evaluated for generating an indication. For example, the comparison is analyzed to determine whether a requirement is met. The requirement may indicate a significant difference between the target subset and the historical subset, such as indicating data drift has likely occurred.

An indication for changing the ML model may be generated when the analysis of the comparison indicates significant differences between the subsets.

For example, then when comparison is for the overlapping features, the analysis may be whether the number of overlapping features is less than a threshold selected according to at least one of: function of a number of features of the target subset, function of a number of features of the historical subset, and combination thereof.

In another example, when the comparison is based on the correlation, the indication to change the ML model may be generated when the correlation is below the correlation threshold.

In yet another example, when the comparison is based on the drift metric, the indication to change the ML model may be generated when the drift metric is above the drift threshold.

At 218, in response to the comparison meeting the requirement, the ML model may be automatically changed. The ML model may be automatically changed using a training dataset that is statically similar to the target input dataset, for example, by using the target input dataset as the training data. Alternatively or additionally, the training dataset that is used is statistically similar to a combination of the target input dataset and the historical dataset, for example, by using a combination of historical training dataset and the target input dataset. The target sub-set of features and/or the historical sub-set of features may be used.

The ML model may be re-trained using the training dataset, and/or updated using the training dataset, and/or a new ML model may be created using the training dataset.

As used herein, the terms change (the ML model), update (the ML model), and re-train (the ML model) may sometimes be used interchangeably, indicating changing the ML to reflect changes to the distribution of the data being fed into it. The terms "change", "update", and "retrain" all refer to process of addressing data drift in a machine learning model. The choice between the terms can depend on the specific context and the extent of the changes required to adapt the model to the drifting data. For example, the term "update" may be used when the changes in the data are relatively minor and the existing ML model can be modified or adjusted. Update may refer to making incremental changes or fine-tuning the model to align with the evolving data distribution without discarding the entire model. Alternatively, the term "retrain" may be used when the data drift is substantial, and the existing ML model's performance is significantly affected such that the ML model is re-trained. Alternatively, the term "change" may be used when the ML model is redone, for example, rebuilding the model from scratch using the existing and/or new data to capture the changes in the data distribution. A new model with updated parameters may be used, or the ML model architecture may be redefined. The new model may be trained on new data that is different from data used to train the previous ML model.

At 220, one or more features described with reference to 202-218 may be iterated. Using the quantum annealer based process to perform feature selection enables rapid iterations. For example:

The target input dataset of a current iteration is designated as the historical input dataset of a subsequent iteration. The target input dataset of the subsequent iteration is obtained in real time or near real-time. In this manner, each dataset is evaluated in comparison to the previously evaluated dataset, to estimate data drift between datasets.

In each iteration the target input dataset represents data obtained after at least a time interval of a selected length has elapsed after a timestamp indicating the historical input dataset has been originally obtained. For example, each iteration is performed every about 1 minute, or 5 minutes, or 1 hour, or 1 day, or 1 week, and the like.

In each iteration the target input dataset represents data obtained after at least a selected quantity of data has been fed into the ML model after the historical input dataset has been fed into the ML model. For example, each iteration is performed every about 1 megabyte of data, or 1 gigabyte of data, or 10 GB, or 100 GB, or 1 terabyte, and the like.

Each iteration may be performed for each new target input dataset being fed into the ML model. This allows each dataset to be evaluated.

Referring now back to FIG. 3, at 302, a ML model trained on a historical training dataset is obtained. The ML model is being evaluated to determine whether it is predicted to classify current data with sufficient accuracy.

At 304, training candidate features are extracted from the historical training dataset used to train the ML model. Alternatively or additionally, the candidate features are extracted from another historical dataset which is known to be statistically similar to the historical training dataset, for example, historical datasets fed into the ML model when it was known that the ML model was suitable for classifying the historical dataset with sufficient accuracy.

The training candidate feature may be extracted, for example, using the approach described with reference to 204 of FIG. 2.

At 306, a feature selection process is applied for selecting a training subset of the training candidate features. An exemplary approach for feature selection, optionally using the quantum annealer based process, is described with reference to 206 of FIG. 2.

At 308, a target dataset representing generated data destined for being fed into the ML model is obtained. The target dataset may be, for example, real time data that is being fed into the ML model. Exemplary target datasets are described for example, with reference to 202 of FIG. 2.

At 310, target candidate features may be extracted from the target dataset. The target candidate feature may be extracted, for example, using the approach described with reference to 204 of FIG. 2.

At 312, the feature selection process may be applied for selecting a target subset of the target candidate features. An exemplary approach for feature selection, optionally using the quantum annealer based process, is described with reference to 206 of FIG. 2.

At 314, a comparison between the training subset and the target subset may be computed. An exemplary approach for computing the comparison is described, for example, with reference to 214 of FIG. 2.

At 316, in response to the comparison meeting a requirement indicating a non-significant difference between the training subset and the target subset, the ML model is validated for being fed the target dataset. A generation indicating that validity of the ML model may be generated. Alternatively, no indication is generated. The target dataset may be automatically fed into the ML model.

At 318, in response to the comparison failing to meet the requirement indicating a non-significant difference between the training subset and the target subset, and/or the comparison meeting another requirement indicating a significant difference between the training subset and the target subset, the ML model is non-validated for being fed the target dataset. A generation indicating that validity of the ML model may be generated. Alternatively, no indication is generated. The target dataset may not be fed into the ML model, and/or blocked from being fed into the ML model. The ML model may be changed, optionally automatically, for example, as described with reference to 218 of FIG. 2.

Various embodiments and/or aspects of the present disclosure as delineated hereinabove and as claimed in the claims section below find experimental and/or calculated support in the following examples.

EXAMPLES

Reference is now made to the following examples, which together with the above descriptions illustrate some embodiments of the invention in a not necessarily limiting fashion.

Inventors evaluated network data of different internet of things (IoT) devices: Amazon Echo Look, Amazon Echo Plus, Google OnHub, LG Smart TV, Nest Cam Ring Doorbell, Samsung SmartThings Hub, and Smart WiFi Plug.

A few minutes of network data recordings was used to generate the training dataset.

A machine learning model, implemented as a Random Forest architecture, was trained to classify the network traffic into one of the IoT device, i.e., to determine to which of the devices the network traffic is related to.

1246 network data features were generated, after preprocessing.

The initial dataset (i.e., historical data) was from 2020, the second (i.e., current dataset) was from 2021.

Reference is now made to FIG. 4, which includes tables summarizing performance of the Random Forest model for different combinations of selected features and datasets of the experiment, in accordance with some embodiments of the present invention.

Table 402 presents results for a Random Forest model trained on a full feature set, tested on the 2020 dataset and the 2021 dataset. No feature selection was done. The results show decrease in performance when features extracted for data of one year are applied to data of another year. It is noted that without feature selection, this approach may be impractical to perform periodically for monitoring when the ML model is to be changed, since each execution of the process is computationally intensive and takes a long time.

Each rows of table 402 indicates the year of the training dataset. Columns of table 402 indicate the year (2020 and 2021) of the test data fed into the ML model.

A performance accuracy of 99.8% was obtained for the ML model trained on 2020 data, fed a 2020 test dataset. A performance accuracy of 94% was obtained for the ML model trained on 2020 data, fed a 2021 test dataset. A performance accuracy of 68% was obtained for the ML model trained on 2021 data, fed a 2020 test dataset. A performance accuracy of 99.9% was obtained for the ML model trained on 2021 data, fed a 2021 test dataset.

Table 404 presents results obtained by apply the feature selection process using a quantum annealer based process applied to the features extracted from the 2020 and 2021 dataset. The best 20 features from the 2020 dataset were extracted. The results show that extracting different features from a dataset of a certain timeframe that is different from the timeframe of the dataset that is fed into the ML model results in low performance, indicating that the ML model is to be changed.

Each rows of table 404 denotes a different training dataset created by applying the best 20 features extracted from the 2020 dataset, to the 2020 dataset, and to the 2021 dataset. Columns of table 404 indicate the year (2020 and 2021) of the test data fed into the ML model.

A performance accuracy of 99.5% was obtained for the ML model trained on 2020 data to which the best features extracted from 2020 were applied, fed a 2020 test dataset. A performance accuracy of 62% was obtained for the ML model trained on 2020 data to which the best features extracted from 2020 were applied, fed a 2021 test dataset. A performance accuracy of 68% was obtained for the ML model trained on 2021 data to which the best features extracted from 2020 were applied, fed a 2020 test dataset. A performance accuracy of 99.9% was obtained for the ML model trained on 2021 data to which the best features extracted from 2020 were applied, fed a 2021 test dataset.

Table 406 presents results obtained by apply the feature selection process using a quantum annealer based process applied to the features extracted from the 2020 and 2021 dataset. The best 20 features from the 2021 dataset were extracted. The results show that extracting different features from a dataset of a certain timeframe that is different from the timeframe of the dataset that is fed into the ML model results in low performance, indicating that the ML model is to be changed.

Each rows of table 406 denotes a different training dataset created by applying the best 20 features extracted from the 2021 dataset, to the 2020 dataset, and to the 2021 dataset.

Columns of table 404 indicate the year (2020 and 2021) of the test data fed into the ML model.

A performance accuracy of 99.8% was obtained for the ML model trained on 2020 data to which the best features extracted from 2021 were applied, fed a 2020 test dataset. A performance accuracy of 91% was obtained for the ML model trained on 2020 data to which the best features extracted from 2021 were applied, fed a 2021 test dataset. A performance accuracy of 63% was obtained for the ML model trained on 2021 data to which the best features extracted from 2021 were applied, fed a 2020 test dataset. A performance accuracy of 99.9% was obtained for the ML model trained on 2021 data to which the best features extracted from 2021 were applied, fed a 2021 test dataset.

It is noted that using a small dataset for Random Forest, which may be created using the features selected by the quantum annealer, speeds up performance and/or reduces computation time.

The results provide empirical evidence that periodically running the process using the quantum annealer to extract features from different datasets to determine when to change the ML model is practical and/or feasible using commonly available processing resources. Running a similar process without the quantum annealer, and/or running a standard process to determine when the change the ML model, is not necessarily practical and/or feasible using commonly available processing resources, since the process may take too long, such a days and/or weeks, and therefore cannot be practically and/or feasibly run periodically. Moreover, periodically running a process based on using the full set of features to determine when to change the ML model is not practical and/or not feasible using commonly available processing resources, since it will take too long to extract and analyze the full set of features.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models and optimization engines such as quantum annealer, will be developed and the scope of the terms ML model, optimization engine, and quantum annealer are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of detecting data drift for changing a machine learning (ML) model, comprising:

monitoring a target input dataset for being fed into the ML model;

extracting a plurality of target candidate features from the target input dataset;

applying a feature selection process for selecting a target subset of the plurality of target candidate features;

accessing a historical input dataset previously determined as being suitable for being fed into the ML model;

extracting a plurality of historical candidate features from the historical input dataset;

applying the feature selection process for selecting a historical subset of the plurality of historical candidate features;

computing a comparison between the target subset and the historical subset; and in response to the comparison meeting a requirement indicating a significant difference between the target subset and the historical subset, generating an indication for changing the ML model.

2. The computer implemented method of claim 1, wherein the feature selection process comprises defining a target function according to the plurality of target candidate features and a correlation with an expected outcome of the ML model being fed the input dataset, and finding a minimum of the target function, the minimum representing the target subset.

3. The computer implemented method of claim 2, further comprising applying a quantum annealer based process for finding the minimum of the function.

4. The computer implemented method of claim 1, wherein the plurality of candidate features are different from features extracted from the input dataset for being fed into the ML model.

5. The computer implemented method of claim 1, wherein none of the plurality of candidate features extracted from the input dataset are fed into the ML model.

6. The computer implemented method of claim 1, wherein the plurality of candidate features corresponding to the extracted features fed into the ML model.

7. The computer implemented method of claim 1, wherein computing the comparison comprising computing a correlation between the target subset and the historical subset.

8. The computer implemented method of claim 1, wherein computing the comparison comprises identifying overlapping features between the target subset and the historical subset.

9. The computer implemented method of claim 1, wherein the requirement is for the number of overlapping features being less than a threshold selected according to at least one of: function of a number of features of the target subset, function of a number of features of the historical subset, and combination thereof.

10. The computer implemented method of claim 1, further comprising in response to the comparison meeting the requirement, automatically re-training the ML model with a training dataset that is statically similar to the target input dataset.

11. The computer implemented method of claim 1, further comprising in response to the comparison meeting the requirement, automatically re-training the ML model with the target sub-set of features.

12. The computer implemented method of claim 1, further comprising in response to the comparison meeting the requirement, automatically re-training the ML model with a combination of the target sub-set of features and the historical sub-set of features.

13. The computer implemented method of claim 1, wherein the target candidate features comprise current data designated for being fed into the ML model of a current update version, and the historical input dataset was previously determined as being suitable for being fed into the ML model of the current update version after being updated from a historical update version.

14. The computer implemented method of claim 1, wherein the features of the method are iterated in a plurality of iterations, wherein the target input dataset of a current iteration is designated as the historical input dataset of a subsequent iteration, and the target input dataset of the subsequent iteration is obtained as data obtained in real time or near real-time.

15. The computer implemented method of claim 1, wherein the features of the method are iterated in a plurality of iterations, wherein in each iteration the target input dataset represents data obtained after at least a time interval of a selected length has elapsed after a timestamp indicating the historical input dataset has been originally obtained.

16. The computer implemented method of claim 1, wherein the features of the method are iterated in a plurality of iterations, wherein in each iteration the target input dataset represents data obtained after at least a selected quantity of data has been fed into the ML model after the historical input dataset has been fed into the ML model.

17. The computer implemented method of claim 1, wherein the features of the method are iterated for each new target input dataset being fed into the ML model.

18. A system for detecting data drift for changing a machine learning (ML) model, comprising:

at least one processor executing a code for:

monitoring a target input dataset for being fed into the ML model;

extracting a plurality of target candidate features from the target input dataset;

applying a feature selection process for selecting a target subset of the plurality of target candidate features;

accessing a historical input dataset previously determined as being suitable for being fed into the ML model;

extracting a plurality of historical candidate features from the historical input dataset;

applying the feature selection process for selecting a historical subset of the plurality of historical candidate features;

computing a comparison between the target subset and the historical subset; and in response to the comparison meeting a requirement indicating a significant difference between the target subset and the historical subset, generating an indication for changing the ML model.

* * * * *